US012674016B2

(12) United States Patent
Deng et al.

(10) Patent No.: US 12,674,016 B2
(45) Date of Patent: Jul. 7, 2026

(54) HIGH-SOLIDS CURABLE FILM-FORMING COMPOSITIONS AND METHODS OF IMPROVING APPEARANCE OF COATINGS CONTAINING EFFECT PIGMENTS

(71) Applicant: PPG Industries Ohio, Inc., Cleveland, OH (US)

(72) Inventors: Jun Deng, Mars, PA (US); Hongying Zhou, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 18/576,122

(22) PCT Filed: Jun. 30, 2022

(86) PCT No.: PCT/US2022/073297
§ 371 (c)(1),
(2) Date: Jan. 3, 2024

(87) PCT Pub. No.: WO2023/283524
PCT Pub. Date: Jan. 12, 2023

(65) Prior Publication Data

US 2024/0327564 A1 Oct. 3, 2024

Related U.S. Application Data

(60) Provisional application No. 63/218,576, filed on Jul. 6, 2021.

(51) Int. Cl.

| | |
|---|---|
| ***C08G 18/62*** | (2006.01) |
| ***C08G 18/32*** | (2006.01) |
| ***C08G 18/34*** | (2006.01) |
| ***C08G 18/42*** | (2006.01) |
| ***C08G 18/66*** | (2006.01) |
| ***C08G 18/79*** | (2006.01) |
| ***C09D 5/36*** | (2006.01) |
| ***C09D 7/40*** | (2018.01) |
| ***C09D 7/61*** | (2018.01) |
| ***C09D 175/04*** | (2006.01) |

(52) U.S. Cl.
CPC ..... *C08G 18/6229* (2013.01); *C08G 18/3206* (2013.01); *C08G 18/348* (2013.01); *C08G 18/423* (2013.01); *C08G 18/6607* (2013.01); *C08G 18/6625* (2013.01); *C08G 18/792* (2013.01); *C08G 18/798* (2013.01); *C09D 5/36* (2013.01); *C09D 7/61* (2018.01); *C09D 7/70* (2018.01); *C09D 175/04* (2013.01)

(58) Field of Classification Search
None
See application file for complete search history.

(56) References Cited

U.S. PATENT DOCUMENTS

| | | | | |
|---|---|---|---|---|
| 5,066,698 | A | 11/1991 | Hazan et al. | |
| 5,965,272 | A | 10/1999 | Donnelly et al. | |
| 6,130,286 | A | 10/2000 | Thomas | |
| 6,458,885 | B1 | 10/2002 | Stengel et al. | |
| 7,019,052 | B1 | 3/2006 | Rink et al. | |
| 2004/0115357 | A1 | 6/2004 | Ma et al. | |
| 2006/0069202 | A1 | 3/2006 | Becker et al. | |
| 2007/0117938 | A1 | 5/2007 | Martz et al. | |
| 2008/0199625 | A1 | 8/2008 | Niwa | |
| 2009/0075063 | A1 | 3/2009 | Iida et al. | |
| 2009/0076218 | A1 | 3/2009 | Zhao et al. | |
| 2011/0165418 | A1 * | 7/2011 | Morow | C09D 7/65 428/354 |
| 2014/0004365 | A1 | 1/2014 | Kitazono et al. | |
| 2016/0333220 | A1 * | 11/2016 | Walters | C08G 18/792 |
| 2020/0038907 | A1 | 2/2020 | Johnson et al. | |

(Continued)

FOREIGN PATENT DOCUMENTS

| | | | |
|---|---|---|---|
| CN | 101031624 | A | 9/2007 |
| EP | 3950865 | A1 | 2/2022 |
| WO | 2015005434 | A1 | 1/2015 |
| WO | 2019173836 | A1 | 9/2019 |
| WO | 2020194928 | A1 | 10/2020 |

OTHER PUBLICATIONS

Code of Federal Regulations, (2019, pp. 1-10, 40 CFR Part 59 Subpart B, National Volatile Organic Compound Emission Standards for Automobile Refinish Coatings.) (Year: 2019).*
Cardolite, (Renewable CNSL Polyols and Diols, pp. 1-3, 2020, [online], [retrieved on Mar. 17, 2025] https://www.cardolite.com/technology/polyols-diols/#:~:text=EXCELLENT%20INTRINSIC%20PROPERTIES,strength%20to%20CNSL%20based%20polyols) (Year: 2020).*

(Continued)

*Primary Examiner* — Robert S Jones, Jr.
*Assistant Examiner* — Lily K Sloan

(57) ABSTRACT

High solids curable film-forming compositions and coating kits are provided, comprising: (a) a polyisocyanate curing agent; and (b) a film-forming component comprising at least one of (i) a secondary-hydroxyl functional (meth)acrylic polyol having pendant ester functional groups and a weight average molecular weight of 4000 to 8000; and (ii) a reactive constituent comprising: (1) a polymeric polyol comprising a polyester polyol and/or an addition polymer that is different from (i); and (2) an organic medium comprising a hydrophobic and/or sterically hindered reactive diluent having hydroxyl functional groups. Alternatively, the film-forming component (b) comprises the secondary-hydroxyl functional (meth)acrylic polyol (i) and optionally at least one of (1) and (2) above. The (meth)acrylic polyol comprises 20 to 35 percent by weight residues of an epoxy functional ethylenically unsaturated monomer. Methods of improving appearance of an effect pigment-containing coating layer on a substrate are also provided.

15 Claims, No Drawings

(56) References Cited

U.S. PATENT DOCUMENTS

| | | | |
|---|---|---|---|
| 2021/0079009 | A1 | 3/2021 | Walters et al. |
| 2022/0177716 | A1 | 6/2022 | Nakamizu |

OTHER PUBLICATIONS

International Search Report and Written Opinion received for PCT Application Serial No. PCT/US2022/073297 dated Oct. 17, 2022, 11 pages.

* cited by examiner

HIGH-SOLIDS CURABLE FILM-FORMING COMPOSITIONS AND METHODS OF IMPROVING APPEARANCE OF COATINGS CONTAINING EFFECT PIGMENTS

FIELD OF THE INVENTION

The present invention relates to high-solids curable film-forming compositions and methods of improving the appearance of coatings that contain effect pigments.

BACKGROUND OF THE INVENTION

The automotive coatings market has an ongoing demand to provide base coating compositions which contain effect pigments such as metallic or reflective pigments in color-plus-clear coating systems. These are the so-called "glamour finishes" whereby a differential light reflection effect known as "flip-flop", dependent upon the viewing angle, is achieved. This flip-flop effect can be attributed to the proper orientation (i.e., alignment parallel to the substrate surface) of the pigment flake in the base coat. Flip-flop may be measured, for example, using a reflectometer. It is a measure of the change in brightness as a function of viewing angle. The larger the measured number, the greater the color change with angle. A higher flip-flop is desirable for silver and other metallic base coats. It should be noted that a variation in flip-flop value, or flop index, of 0.3 to 0.5 represents a significant difference in appearance.

The base coating composition, which typically contains the effect pigments, is formulated to maximize the flip-flop effect. The outermost top coating composition, which is usually substantially pigment-free (i.e., a "clear coat"), is formulated to maximize appearance properties such as gloss and distinctness of image.

Many multi-package clear coats used in the refinish market, especially polar clearcoats such as isocyanate-based clearcoats, tend to redissolve basecoat binder resins at the interface of the basecoat and the clearcoat. This causes disruption of the pigment flakes in the basecoat, leading to mottling and general disruption of color and finish, which are undesirable. Moreover, while desirable for environmental reasons and often necessary for regulatory reasons, efforts to reduce the volatile organic content ("VOC") of automotive coatings such as by increasing the resin solids content can result in a decreased flip-flop effect. The decreased flip-flop is in part the result of "strike-in"; that is, a softening of the base coat by organic components present in the subsequently-applied clear coating composition. As organic solvent contacts the base coat, pigment flakes contained therein can move, resulting in the random orientation that causes a mottled appearance and decreased flip-flop of the coating layer.

It would be desirable to provide compositions useful as high-solids automotive clearcoats that can meet the continuing aesthetic demands in automotive coatings while complying with lower VOC regulations.

SUMMARY OF THE INVENTION

The present invention is directed to curable film-forming compositions and coating kits, each comprising:

(a) a polyisocyanate curing agent having isocyanate functional groups; and (b) a film-forming component comprising at least one of:

(i) a secondary-hydroxyl functional (meth)acrylic polyol having pendant ester functional groups and having a weight average molecular weight of 4000 to 8000 as determined by gel permeation chromatography using a polystyrene standard; and (ii) a reactive constituent comprising:

(1) a polymeric polyol comprising a polyester polyol and/or an addition polymer that is different from the secondary-hydroxyl functional (meth)acrylic polyol (i); and (2) an organic medium comprising a hydrophobic and/or sterically hindered reactive diluent having hydroxyl functional groups that are reactive with the isocyanate functional groups in (a).

Alternatively, the film-forming component (b) comprises:

(i) a secondary-hydroxyl functional (meth)acrylic polyol having pendant ester functional groups and having a weight average molecular weight of 4000 to 8000 as determined by gel permeation chromatography using a polystyrene standard; and (ii) at least one of:

(1) a polymeric polyol comprising a polyester polyol and/or an addition polymer that is different from the secondary-hydroxyl functional (meth)acrylic polyol (i); and (2) an organic medium comprising a hydrophobic and/or sterically hindered reactive diluent having hydroxyl functional groups that are reactive with the isocyanate functional groups in (a).

In either scenario, the secondary hydroxyl functional (meth)acrylic polyol contains residues of an epoxy functional ethylenically unsaturated monomer from which the ester functional groups are pendant, and the residues are present in the secondary hydroxyl functional (meth)acrylic polyol in an amount of 20 to 35 percent by weight, based on the total weight of the secondary hydroxyl functional (meth) acrylic polyol. Additionally, in either scenario, the polymeric polyol (1) is different from and is not prepared in the reactive diluent, and the curable film-forming composition is considered "high-solids", having a total resin solids content of at least 55, or at least 57, or at least 60, and at most 80, or at most 75, or at most 70, or at most 65 percent by weight, based on the total weight of the curable film-forming composition.

In certain examples of the present invention, the reactive diluent may have a calculated water partition coefficient C Log P greater than 3, or greater than 5, or greater than 8, or greater than 10, and/or the reactive diluent may have sterically hindered functional groups that are reactive with the isocyanate functional groups in (a).

The present invention is also drawn to methods of improving appearance of an effect pigment-containing coating layer on a substrate, comprising:

(1) applying a first film-forming composition to at least a portion of a substrate to form a coated substrate, wherein the first film-forming composition comprises an effect pigment;

(2) applying a transparent, curable film-forming composition to at least a portion of the coated substrate formed in step (1) to form a multi-layer coated substrate; and (3) subjecting the multi-layer coated substrate formed in step (2) to a temperature and for a time sufficient to cure the curable film-forming compositions. In the methods of the present invention, the transparent, curable film-forming composition is that described above wherein the film-forming component (b) comprises:

(i) a secondary-hydroxyl functional (meth)acrylic polyol having pendant ester functional groups and having a weight average molecular weight of 4000 to 8000 as determined by gel permeation chromatography using a polystyrene standard, wherein the secondary hydroxyl functional (meth)acrylic polyol contains residues of an epoxy functional ethylenically unsaturated monomer from which the ester functional groups are pendant, wherein the residues are present in the secondary hydroxyl functional (meth)acrylic polyol in an amount of 20 to 35 percent by weight, based on the total weight of the secondary hydroxyl functional (meth)acrylic polyol; and optionally (ii) at least one of:

(1) a polymeric polyol comprising a polyester polyol and/or an addition polymer that is different from the secondary-hydroxyl functional (meth)acrylic polyol (i); and (2) an organic medium comprising a hydrophobic and/or sterically hindered reactive diluent having hydroxyl functional groups that are reactive with the isocyanate functional groups in (a); wherein the polymeric polyol (1) is different from and is not prepared in the reactive diluent, and wherein the curable film-forming composition has a total resin solids content of at least 55, or at least 57, or at least 60, and at most 80, or at most 75, or at most 70, or at most 65 percent by weight, based on the total weight of the curable film-forming composition.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The term "curable", as used for example in connection with a curable composition, means that the indicated composition is polymerizable or cross linkable through functional groups, e.g., by means that include, but are not limited to, thermal (including ambient cure) and/or catalytic exposure. By ambient conditions is meant that the coating undergoes a thermosetting reaction without the aid of heat or other energy, for example, without baking in an oven, use of forced air, or the like. Usually ambient temperature ranges from 60 to 90° F. (15.6 to 32.2° C.), such as a typical room temperature, 72° F. (22.2° C.). However, ambient temperature may be, for example, as low as 35° F. (1.6° C.) and as high as 115° F. (46.1° C.), depending on location.

The term "cure", "cured" or similar terms, as used in connection with a cured or curable composition, means that at least a portion of the polymerizable and/or crosslinkable components that form the curable composition is polymerized and/or crosslinked through reactive functional groups, to the extent that a cured film prepared from the composition demonstrates no damage from at least 50 methylethyl ketone (MEK) double rubs according to ASTM D5402-19. The test method may be performed, for example, using the specified cheesecloth or another suitable cloth such as a Wypall X80 towel available from Kimberly Clark Corporation. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion, such as at least 10 percent, or at least 20 percent, of the reactive groups of the composition occurs, to form a polymerizate. The polymerizable composition can also be subjected to curing conditions such that a substantially complete cure is attained (such as at least 70 percent, or at least 80 percent, or at least 90 percent up to 100 percent, of the reactive groups react) and wherein further curing results in no significant further improvement in polymer properties, such as hardness.

The various embodiments and examples of the present invention as presented herein are each understood to be non-limiting with respect to the scope of the invention.

The curable film-forming compositions and coating kits of the present invention comprise (a) a polyisocyanate curing agent. The polyisocyanate curing agent typically has free isocyanate groups (i.e., as opposed to blocked isocyanate groups) that are available for reaction with suitable co-reactants. The polyisocyanate can be aliphatic, aromatic, or a combination thereof. It is usually aliphatic. Diisocyanates and higher polyisocyanates such as isocyanurates of diisocyanates can be used. Isocyanate prepolymers, for example reaction products of polyisocyanates with polyols also can be used. Examples may include a reaction product of a polyisocyanate monomer with 1,3-propanediol, 1,4-butanediol and/or 1,6-hexanediol, diethylene glycol, triethylene glycol or tetraethylene glycol with diarylcarbonates or cyclic carbonates. Examples of other polyisocyanate prepolymers and polyisocyanate polymers include reaction products of a polyisocyanate monomer with a polyol of number average molecular weight 62 to 20,000, such as polyester polyols, polycaprolactone polyols, polyether polyols, polyhydroxy polycarbonates, polyhydroxy polyacetals, polyhydroxy polyacrylates, polyhydroxy polyester amides, polyhydroxy polythioethers. Mixtures of polyisocyanates can be used.

In particular examples of the present invention, the polyisocyanate curing agent (a) comprises an aliphatic polyisocyanate, and comprises less than 10 percent by weight, or less than 5 percent by weight, or less than 2 percent by weight of a polyisocyanate monomer, based on the total weight of resin solids in the curable film-forming composition. A polyisocyanate monomer is one that has not reacted to form a dimer, biuret, isocyanurate, or other larger polyisocyanate, and may include 4,4'-methylene-bis(cyclohexyl isocyanate), isophorone diisocyanate, 2,2,4-trimethyl hexamethylene diisocyanate, 2,4,4-trimethyl hexamethylene diisocyanate, 1,6-hexamethylene diisocyanate, and tetramethylxylene diisocyanate.

The polyisocyanate can be prepared from a variety of isocyanate-containing materials. Examples of particularly suitable polyisocyanates include dimers and/or trimers prepared from 4,4'-methylene-bis(cyclohexyl isocyanate), isophorone diisocyanate, an isomeric mixture of 2,2,4- and 2,4,4-trimethyl hexamethylene diisocyanate, or 1,6-hexamethylene diisocyanate. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C. Examples of particularly suitable polyisocyanate curing agents include TOLONATE HDT-LV, available from Vencorex Chemicals, and DESMODUR Z 4470 BA, available from Covestro AG.

The polyisocyanate curing agent (a) is typically present in the curable film-forming composition in an amount of at least 10, such as at least 20, or least 35 percent by weight, based on the total weight of resin solids in the curable film-forming composition. The polyisocyanate (a) may be present in the curable film-forming composition of the present invention in an amount of at most 80, or at most 70 percent by weight, or at most 60 percent by weight, based on the total weight of resin solids in the curable film-forming composition. Thus, the polyisocyanate may be present in the curable film-forming composition in an amount, for example, of 10 to 80 percent by weight, or 10 to 70 percent by weight, or 10 to 60 percent by weight, or 20 to 80 percent by weight, or 20 to 70 percent by weight, or 20 to 60 percent by weight, or 35 to 80 percent by weight, or 35 to 70 percent by weight, or 35 to 60 percent by weight. As used herein "based on the total weight of resin solids" means that the amount of the component added during the formation of the composition is based upon the total weight of the non-volatile resins of the film forming materials, including cross-linkers, reactive diluents, adhesion promoters, and polymers present during the formation of the composition, but not including any water, volatile organic solvent, or any additive solids such as hindered amine stabilizers, photoinitiators, pigments including extender pigments and fillers, flow modifiers, catalysts, and UV light absorbers, unless otherwise indicated. The phrases "based on the total solid weight" and "based on the total weight of solids" (used interchangeably) of the composition means that the amount of the component added during the formation of the composition is based upon the total weight of the solids (non-volatiles) of the film forming materials, including cross-linkers, reactive diluents, adhesion promoters, and polymers, pigments including extender pigments and fillers, additive solids such as hindered amine stabilizers, photoinitiators, flow modifiers, catalysts, and UV light absorbers present during the formation of the composition, but not including any water or volatile organic solvent, unless otherwise indicated.

The curable film-forming compositions and coating kits of the present invention further comprise (b) a film-forming component. The film-forming component (b) may comprise (i) a secondary-hydroxyl functional (meth)acrylic polyol having pendant ester functional groups. Such polyols have an acrylic backbone prepared by addition polymerization of ethylenically unsaturated monomers using art-recognized methods, and side (i.e., pendant) chains with secondary hydroxyl and ester functional groups. The pendant chains are prepared from acids having 5 to 20 carbon atoms as discussed below.

Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

Beta-hydroxy ester functional monomers may be used to generate the pendant chains with ester functional groups. Such beta-hydroxy ester functional monomers can be prepared from ethylenically unsaturated, epoxy functional monomers and carboxylic acids having from about 5 to about 20 carbon atoms.

Examples of ethylenically unsaturated, epoxy functional monomers used to prepare the beta-hydroxy ester functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. More often, these epoxy functional monomers are used to prepare epoxy functional (meth)acrylic polymers, and the epoxy functional (meth)acrylic polymers are post-reacted with a carboxylic acid to form the secondary-hydroxyl functional (meth)acrylic polyol having pendant ester functional groups. In the preparation of the epoxy functional (meth)acrylic polymer, the ethylenically unsaturated, epoxy functional monomer is typically used in an amount of 40 to 70 percent by weight, such as 40 to 60 percent by weight, or 50 to 70 percent by weight, or 50 to 60 percent by weight, based on the total weight of ethylenically unsaturated monomers used to prepare the (meth) acrylic polymer. Examples of carboxylic acids suitable for reaction with the epoxy functional groups may include at least one of isostearic acid, benzoic acid, 2-ethylhexanoic acid, isononanoic acid, pivalic acid, and 12-hydroxystearic acid.

Additional hydroxyl functional ethylenically unsaturated monomers may be used in the preparation of the (meth) acrylic polymer. Such monomers include hydoxyethyl (meth)acrylate, hydroxypropyl (meth)acrylate, and others listed below, as well as beta-hydroxy ester functional monomers prepared from ethylenically unsaturated acid functional monomers and epoxy compounds containing at least 5 carbon atoms which are not polymerizable with the ethylenically unsaturated acid functional monomer. Examples of ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, often containing from 5 to 30 carbon atoms, such as butyl glycidyl ether, octyl glycidyl ether, phenyl glycidyl ether and para-(tertiary butyl) phenyl glycidyl ether. Particular glycidyl esters include those of the structure:

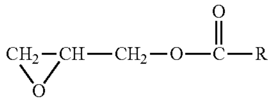

where R is a hydrocarbon radical containing from about 4 to about 26 carbon atoms. Typically, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

The preparation of an exemplary secondary-hydroxyl functional (meth)acrylic polyol having pendant ester functional groups is shown in the working Examples below, where the preparation of an epoxy functional (meth)acrylic polymer using glycidyl methacrylate is demonstrated in Example A, followed by post-reaction with isostearic acid to yield the secondary-hydroxyl functional (meth)acrylic polyol having pendant ester functional groups in Example B. Usually, the epoxy functional (meth)acrylic polymer demonstrates a weight average molecular weight of at least 2000, or at least 2500, or at least 3000, and at most 4000, or at most 3500, prior to reaction with the carboxylic acid. Thus, the epoxy functional (meth)acrylic polymer may demonstrate a weight average molecular weight of 2000 to 4000, or 2000 to 3500, or 2500 to 4000, or 2500 to 3500, or 3000 to 4000, or 3000 to 3500. The weight average molecular weight of the secondary-hydroxyl functional (meth)acrylic polyol having pendant ester functional groups is typically 4000 to 8000, such as 4000 to 7000, or 5000 to 8000, or 5000 to 7000. Weight average molecular weight may be determined, for example, by gel permeation chromatography using a WATERS 2695 separation module with a WATERS 410 differential refractometer (RI detector) and polystyrene standards. Secondary-hydroxyl functional (meth)acrylic polyols having pendant ester functional groups may be prepared from any of the components disclosed above and are expected to perform in a manner comparable to that which is demonstrated in the working Examples.

The secondary-hydroxyl functional (meth)acrylic polyol having pendant ester functional groups contains residues of epoxy functional ethylenically unsaturated monomers in an amount of 20 to 35 percent by weight, based on the total weight of the secondary hydroxyl functional (meth)acrylic polyol. By "residue" is meant a moiety that is present in a reaction product (such as a polymer), formed by a particular reactant (such as a monomer) during reaction (e.g., polymerization). The unusually high levels of epoxy functional ethylenically unsaturated monomers allow for the incorporation of a significant number of pendant ester functional groups with secondary-hydroxyl functionality into the (meth)acrylic polymer. These pendant ester functional groups with secondary-hydroxyl functionality provide increased molecular weight and hydrophobicity to the polyol and yet allow for higher solids of the curable film-forming composition while maintaining spray viscosity. It is believed that the number of these pendant groups also allows for high lightness (measured using a BYK Mac instrument) and flop index when applied over a coating containing a flake effect pigment, by minimizing or even preventing strike-in despite the higher resin solids content of the composition. Historically, higher resin solids contribute to strike-in, negatively affecting flop index. Example 7 and Comparative Example 5 below demonstrate the effects of differences in the number of pendant ester functional groups with secondary-hydroxyl functionality.

When used, the secondary-hydroxyl functional (meth) acrylic polyol (i) is typically present in the curable film-forming composition of the present invention in an amount of at least 10, such as at least 20, or least 35, or at least 40, or at least 45 percent by weight, based on the total weight of resin solids in the curable film-forming composition. The secondary-hydroxyl functional (meth)acrylic polyol (i) may be present in the curable film-forming composition of the present invention in an amount of at most 90, such as at most 80, or at most 70 percent by weight, based on the total weight of resin solids in the curable film-forming composition. Thus, the secondary-hydroxyl functional (meth)acrylic polyol (i) may be present in the curable film-forming composition in an amount, for example, of 10 to 90 percent by weight, or 10 to 80 percent by weight, or 10 to 70 percent by weight, or 20 to 90 percent by weight, or 20 to 80 percent by weight, or 20 to 70 percent by weight, or 35 to 90 percent by weight, or 35 to 80 percent by weight, or 35 to 70 percent by weight, or 40 to 90 percent by weight, or 40 to 80 percent by weight, or 40 to 70 percent by weight, or 45 to 90 percent by weight, or 45 to 80 percent by weight, or 45 to 70 percent by weight.

In addition to the secondary-hydroxyl functional (meth) acrylic polyol (i), the film-forming component (b) may further comprise (ii) a reactive constituent comprising at least one of (1) a polymeric polyol and (2) an organic medium comprising a hydrophobic and/or sterically hindered reactive diluent. In certain examples of the present invention, the film-forming component (b) comprises both the polymeric polyol (1) and the organic medium (2) as the reactive constituent (ii).

In certain examples of the present invention, the reactive constituent may be present in the curable film-forming composition with or without the secondary-hydroxyl functional (meth)acrylic polyol (i). However, typically at least one of the secondary-hydroxyl functional (meth)acrylic polyol (i) and the organic medium (2) is present with the polymeric polyol (1). The polymeric polyol (1) and the organic medium (2) may be added to the curable film-forming composition individually in separate packages or as a mixture of the two.

The polymeric polyol (1) may comprise an addition polymer and/or a polyester polyol. The addition polymer may be prepared using any of the ethylenically unsaturated monomers listed above, and/or others known in the art. Hydroxyl functionality may be introduced into the addition polymer as discussed above with respect to the secondary-hydroxyl functional (meth)acrylic polyol (i); however, the addition polymer is different from the secondary-hydroxyl functional (meth)acrylic polyol (i). Hydroxyl functionality may additionally or alternatively be introduced into the addition polymer by including a hydroxyl functional ethylenically unsaturated monomer in the monomer mixture used to prepare the addition polymer. Suitable hydroxyl functional monomers include hydroxyalkyl acrylates and methacrylates, typically having 2 to 4 carbon atoms in the hydroxyalkyl group, such as hydroxyethyl (meth)acrylate, hydroxypropyl (meth)acrylate, 4-hydroxybutyl (meth)acrylate, hydroxy functional adducts of caprolactone and hydroxyalkyl (meth)acrylates, as well as the beta-hydroxy ester functional monomers described above.

The addition polymer typically has a weight average molecular weight of at least 4000, or at least 6000, or at least 8000, to at most 16,000, or at most 14,000, or at most 12,000. For example, the addition polymer may have a weight average molecular weight of 4000 to 16,000, or 4000 to 14,000, or 4000 to 12,000, or 6000 to 16,000, or 6000 to 14,000, or 6000 to 12,000, or 8000 to 16,000, or 8000 to 14,000, or 8000 to 12,000.

As noted, the polymeric polyol (1) may additionally or alternatively comprise a polyester polyol, including alkyd polyester polyols. Such polymers may be prepared in a known manner by condensation of polyhydric alcohols and polycarboxylic acids, with the alcohols in stoichiometric excess. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl (C1 to C5) esters of the acids such as the methyl esters may be used. Suitable fatty acids may be used and include, for example, those prepared from linseed oil, soya bean oil, tall oil, dehydrated castor oil, or tung oil.

The polyester polyol typically has a theoretical (calculated) hydroxyl number of 80 to 300, or 80 to 200, or 80 to 150, or 90 to 300, or 90 to 200, or 90 to 150. The polyester polyol typically has a weight average molecular weight of 1000 to 4000.

When used, the polymeric polyol (1) is typically present in the curable film-forming composition of the present invention in an amount of at least 10, such as at least 20, or least 35, or at least 40, or at least 45 percent by weight, based on the total weight of resin solids in the curable film-forming composition. The polymeric polyol (1) may be present in the curable film-forming composition of the present invention in an amount of at most 90, such as at most 80, or at most 70 percent by weight, based on the total weight of resin solids in the curable film-forming composition. Thus, the polymeric polyol (1) may be present in the curable film-forming composition in an amount, for example, of 10 to 90 percent by weight, or 10 to 80 percent by weight, or 10 to 70 percent by weight, or 20 to 90 percent by weight, or 20 to 80 percent by weight, or 20 to 70 percent by weight, or 35 to 90 percent by weight, or 35 to 80 percent by weight, or 35 to 70 percent by weight, or 40 to 90 percent by weight, or 40 to 80 percent by weight, or 40 to 70 percent by weight, or 45 to 90 percent by weight, or 45 to 80 percent by weight, or 45 to 70 percent by weight.

The organic medium (2) comprises a hydrophobic and/or sterically hindered reactive diluent having hydroxyl functional groups that are reactive with the isocyanate functional groups in the polyisocyanate curing agent (a). The term "reactive diluent" as used herein refers to a compound that serves to dilute a composition and lower the viscosity thereof; also, it will react with other components of the composition via reactive functional groups. However, film-forming resins present in the composition are not to be construed as reactive diluents. By "hydrophobic" is meant that the material described as such (e.g., a monomer or polymer) has non-polar properties as understood in the art. A molecule may be non-polar either when there is an equal sharing of electrons between the two atoms of a diatomic molecule or because of the symmetrical arrangement of polar bonds in a more complex molecule, such that there is no overall dipole in the molecule. The term "non-polar" may be used to describe substances that have a calculated water partition coefficient C Log P greater than 3, or greater than 5, or greater than 8, or greater than 10. The water partition coefficient C Log P may be calculated using CHEMDRAW, available from Perkin Elmer. Steric hindrance refers to any of several effects in which the structure, mobility, or reactivity of a molecule or group thereon is affected or hindered by the physical size and/or proximity of neighboring parts of the molecule. The reactivity of a functional group may be sterically hindered by the location of the group on a molecule (for example, a secondary hydroxyl or secondary amine functional group) and/or the size and nature of other atoms or groups surrounding it, such as the presence of a ring or an alkyl chain in a position alpha or beta with respect to the functional group, thus slowing the functional group's participation in any chemical reactions due to steric bulk.

The reactive diluent typically comprises at least one of castor oil; a dimerized fatty acid diol; a hydroxyl functional branched polyolefin oil; a cashew nutshell liquid (CNSL)-based diol; an alkoxylated diol comprising a secondary hydroxyl group wherein the diol contains 2 to 6 carbon atoms prior to alkoxylation; an alkoxylated triol comprising a secondary hydroxyl group, wherein the triol contains 2 to 6 carbon atoms prior to alkoxylation, and an alkoxylated tetrol comprising a secondary hydroxyl group, wherein the tetrol contains 2 to 6 carbon atoms prior to alkoxylation. Examples of commercially available dimerized fatty acid diols include PRIPOL 2030, commercially available from Croda International Plc. Exemplary cashew nutshell liquid (CNSL)-based diols are available from Cardolite Corporation. Examples of commercially available hydroxyl functional branched polyolefin oils include VYBAR H-6164 and VYBAR H-6175, available from Baker Hughes, Inc. Diols that may be alkoxylated include 1,6-hexanediol, 1,3-propanediol. 2,2-dimethyl-1,3-propanediol, dihydroxy diethyl ether, and glycols such as ethylene glycol, propylene glycol, and butylene glycol. Triols that may be alkoxylated include trimethylol propane and glycerol. Tetrols that may be alkoxylated include erythritol, pentaerythritol, and sorbitan. An example of a suitable alkoxylated trifunctional polyol with secondary hydroxyl groups is POLYOL R3530, available from Perstorp Group.

In certain examples of the present invention, the organic medium further comprises one or more organic solvents that are not reactive with other components of the curable film-forming composition; for example, a mixture of isoparaffins having 8 to 12 carbon atoms, such as the ISOPAR line of products available from ExxonMobil Chemical. Other solvents may include ketones, such as methyl isobutyl ketone and methyl amyl ketone; aromatic hydrocarbons, such as xylene; and acetates such as 2-ethylhexyl acetate and 2-butoxyethyl acetate. However, the reactive diluent contributes to the resin solids content of the curable film-forming compositions of the present invention. It is often present as the only component of the organic medium (2).

When used, the reactive diluent is present in the curable film-forming composition in an amount of at least 5, or at least 10, or at least 20, and at most 50, or at most 40, or at most 30 percent by weight, based on the total weight of polyol solids in the curable film-forming composition. Thus, the reactive diluent may be present in the curable film-forming composition in an amount, for example, of 5 to 50 percent by weight, or 5 to 40 percent by weight, or 5 to 30 percent by weight, or 10 to 50 percent by weight, or 10 to 40 percent by weight, or 10 to 30 percent by weight, or 20 to 50 percent by weight, or 20 to 40 percent by weight, or 20 to 30 percent by weight.

The curable film-forming compositions and kits of the present invention are considered "high-solids", and typically have a total resin solids content of at least 55, or at least 57, or at least 60, and at most 80, or at most 75, or at most 70, or at most 65 percent by weight, based on the total weight of the curable film-forming composition. That is, the curable film-forming compositions and kits of the present invention typically have a total resin solids content of 55 to 80 percent by weight, or 55 to 75 percent by weight, or 55 to 70 percent by weight, or 55 to 65 percent by weight, or 57 to 80 percent by weight, or 57 to 75 percent by weight, or 57 to 70 percent by weight, or 57 to 65 percent by weight, or 60 to 80 percent by weight, or 60 to 75 percent by weight, or 60 to 70 percent by weight, or 60 to 65 percent by weight. Additionally, the curable film-forming compositions and kits of the present invention typically have a volatile organic compound (VOC) content less than 3.5, or less than 2.8, or less than 2.5 lb/gallon, or less than 2.0 lb/gallon. As used herein, "volatile organic compound" and "VOC" are understood to have the definition used by the United States Environmental Protection Agency; i.e., any organic compound having an initial boiling point less than or equal to 250° C. measured at a standard atmospheric pressure of 101.3 kPa.

The curable film-forming compositions and coating kits of the present invention may contain adjunct ingredients conventionally used in coating compositions. Optional ingredients such as, for example, catalysts, plasticizers, surfactants, thixotropic agents and/or other rheology control agents, matting agents, organic cosolvents, flow controllers, anti-oxidants, UV light absorbers (such as in a topcoat composition), corrosion inhibitors, and similar additives conventional in the art may be included in the compositions. These ingredients are typically present at up to about 40% by weight based on the total weight of resin solids.

As noted above, the present invention is also drawn to coating kits. It is often not practical to store ambient-cure coatings as a one-package composition, but rather they must be stored as multi-package coatings to prevent the reactive constituents from curing prior to use. The term "multi-package coatings" refers to coatings in which various constituents are maintained separately until immediately prior to application. The curable film-forming compositions and coating kits of the present invention are usually multi-package coatings comprising multiple, separate components, such as wherein a first package comprises the polyisocyanate curing agent (a) and a second package comprises one or more components of the film-forming component (b). For example, a first package may comprise the polyisocyanate curing agent (a), and a second package may comprise the secondary-hydroxyl functional (meth)acrylic polyol (i). In another example, a first package may comprise the polyisocyanate curing agent (a), and a second package may comprise the reactive constituent (ii). The reactive diluent, when used, may be present in the second package (with the secondary-hydroxyl functional (meth)acrylic polyol (i) and/or with the polymeric polyol (1)) or in a third package, with or without non-reactive organic solvents.

The curable film-forming compositions and kits of the present invention may be used to prepare a coated article comprising a substrate and the curable film-forming composition described above, applied to at least one surface of the substrate. The curable film-forming composition is most advantageously used as a transparent topcoat ("clear coat") over a pigmented basecoat that contains one or more effect pigments, in a method of improving appearance of an effect pigment-containing coating layer on a substrate. The term "transparent", as used in connection with a clear coat, means that the indicated coating has the property of transmitting visible light without appreciable scattering so that objects lying beyond are entirely visible, with visible light transmittance typically higher than 70%, often higher than 80%, and most often higher than 90%. An alternative suitable definition of "transparent" is that the coating demonstrates a BYK Haze index less than 50, as measured using a BYK/Haze Gloss instrument. This method of the present invention comprises:

(1) applying a first film-forming composition to at least a portion of a substrate to form a coated substrate, wherein the first film-forming composition comprises an effect pigment;

(2) applying a transparent, curable film-forming composition to at least a portion of the coated substrate formed in step (1) to form a multi-layer coated substrate; and (3) subjecting the multi-layer coated substrate formed in step (2) to a temperature and for a time sufficient to cure the curable film-forming compositions. The transparent curable film-forming composition is typically applied directly to the first film-forming composition (i.e., without any intervening layers), and before curing the first film-forming composition. In the method of the present invention, the transparent curable film-forming composition comprises: (a) a polyisocyanate curing agent having isocyanate functional groups as described above; and (b) a film-forming component comprising: (i) the secondary-hydroxyl functional (meth)acrylic polyol having pendant ester functional groups described above; and optionally (ii) at least one of: (1) any of the polymeric polyols described above comprising a polyester polyol and/or an addition polymer that is different from the secondary-hydroxyl functional acrylic polymer (i); and (2) the organic medium described above comprising a hydrophobic and/or sterically hindered reactive diluent having hydroxyl functional groups that are reactive with the isocyanate functional groups in (a). The polymeric polyol (1) is different from and is not prepared in the reactive diluent, and the curable film-forming composition has a total resin solids content of at least 55, or at least 57, or at least 60, and at most 80, or at most 75, or at most 70, or at most 65 percent by weight, based on the total weight of the curable film-forming composition. In the method of the present invention, the appearance of an effect pigment-containing coating layer on a substrate is improved compared to the appearance of the same pigment-containing coating layer on a substrate with a different film-forming composition applied on top of the coated substrate; in particular, a film-forming composition that contains a different film-forming component. As mentioned above, many multi-package clear coats used in the refinish market, especially polar clearcoats such as isocyanate-based clearcoats, tend to redissolve basecoat binder resins at the interface of the basecoat and the clearcoat. This causes disruption of the pigment flakes in the basecoat, leading to undesirable appearance. Such disruption does not occur with the use of the curable film-forming compositions of the present invention over an effect pigment-containing coating layer.

Suitable substrates may include metallic and/or non-metallic materials. Non-metallic substrates include polymeric, plastic, polyester, polyolefin, polyamide, cellulosic, polystyrene, polyacrylic, poly(ethylene naphthalate), polypropylene, polyethylene, nylon, EVOH, poly(lactic acid), other "green" polymeric substrates, poly(ethylene terephthalate) ("PET"), polycarbonate, polycarbonate acrylonitrile butadiene styrene ("PC/ABS"), polyamide, polymer composites and the like. Car parts typically formed from thermoplastic and thermoset materials include bumpers and trim.

The metal substrates used in the present invention include ferrous metals, non-ferrous metals and combinations thereof. Suitable ferrous metals include iron, steel, and alloys thereof. Non-limiting examples of useful steel materials include cold rolled steel, pickled steel, steel surface-treated with any of zinc metal, zinc compounds and zinc alloys (including electrogalvanized steel, hot-dipped galvanized steel, GALVANNEAL steel, and steel plated with zinc alloy) and/or zinc-iron alloys. Also, aluminum, aluminum alloys, zinc-aluminum alloys such as GALFAN, GALVALUME, aluminum plated steel and aluminum alloy plated steel substrates may be used, as well as magnesium metal, titanium metal, and alloys thereof. Steel substrates (such as cold rolled steel or any of the steel substrates listed above) coated with a weldable, zinc-rich or iron phosphide-rich organic coating are also suitable for use in the present invention. Such weldable coating compositions are disclosed in U.S. Pat. Nos. 4,157,924 and 4,186,036. Cold rolled steel is also suitable when pretreated with an appropriate solution known in the art, such as a metal phosphate solution, an aqueous solution containing at least one Group IIIB or IVB metal, an organophosphate solution, an organophosphonate solution, and combinations thereof, as discussed below.

The substrate may alternatively comprise more than one metal or metal alloy in that the substrate may be a combination of two or more metal substrates assembled together such as hot-dipped galvanized steel assembled with aluminum substrates. The substrate may alternatively comprise a composite material such as a fiberglass composite. The coated articles of the present invention can comprise at least two different substrates, which may include both metal and non-metal parts, to which the curable film-forming composition is applied with acceptable adhesion on each substrate.

The coated article may comprise part of a vehicle, prepared using one or more suitable substrates. "Vehicle" is used herein in its broadest sense and includes all types of vehicles, such as but not limited to airplanes, helicopters, cars, trucks, buses, vans, golf carts, motorcycles, bicycles, railroad cars, tanks and the like. It will be appreciated that the portion of the vehicle that is coated according to the present invention may vary depending on why the coating is being used.

The shape of the substrate can be in the form of a sheet, plate, bar, rod or any shape desired, but it is usually in the form of an automobile part, such as a body, door, fender, hood or bumper. The thickness of the substrate can vary as desired.

The coated article may alternatively comprise a component of a building, bridge, industrial protective structure, ship, railcar, railcar container, water tower, power line tower, tunnel, oil or gas industry structure, marine structure, aerospace structure, bridge support structure, pipeline, oil rig, storage tank, or wind turbine, again, prepared using one or more suitable substrates.

Metal substrates to be used may be bare substrates. By "bare" is meant a virgin substrate that has not been treated with (or has been stripped of) any pretreatment compositions such as conventional phosphating baths, heavy metal rinses, etc. Additionally, bare metal substrates being used in the present invention may be a cut edge of a substrate that is otherwise treated and/or coated over the rest of its surface. Alternatively, the substrates may undergo one or more treatment steps known in the art prior to the application of the curable film-forming composition.

Before depositing any coating compositions upon the surface of the substrate, it is common practice, though not necessary, to remove foreign matter or previously applied paints such as OEM coatings from the surface by thoroughly stripping, cleaning and degreasing the surface. When the substrate is not an existing vehicle part, such cleaning typically takes place after forming the substrate (stamping, welding, etc.) into an end-use shape. The surface of the substrate can be cleaned by physical or chemical means, or both, such as mechanically abrading the surface (e.g., sanding) or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG.

In the method of the present invention, at least one additional film-forming composition may be applied as an intervening layer between the first film-forming composition and the substrate(s). This may comprise at least one of an electrodeposited layer, a primer, a sealer, and a primer-sealer as known in the art.

The first film-forming composition is typically a colored basecoat (e.g., a decorative coating layer containing a colorant) as known in the art of surface coatings such as automotive refinish coatings, and is usually curable under ambient conditions. The first film-forming composition comprises an effect pigment. The pigment, or colorant, can be added to the coating in any suitable form, such as discrete particles, dispersions, solutions and/or flakes. Effect pigments are often flakes. A colorant can be organic or inorganic and can be agglomerated or non-agglomerated. Colorants can be incorporated into the coatings by grinding or simple mixing, although simple mixing is often used because grinding can deform pigment flakes, negatively affecting the final appearance of the coating layer. A single colorant or a mixture of two or more colorants can be used in the coatings of the present invention.

"Effect pigment" refers to pigments which provide sparkling brilliance or a color-changing (depending on viewing angle), iridescent pattern to a coating film, and those known in the art can be used without limitation. As an effect pigment, for example, aluminum, vapor-deposited aluminum, copper, zinc, brass, nickel, aluminum oxide, mica, aluminum oxide coated with iron oxide, mica coated with titanium oxide or iron oxide and the like can be used. These metallic pigments can be used either alone or in combinations of two or more. Aluminum pigment is the most commonly used effect pigment. There are non-leafing type aluminum and leafing type aluminum, both of which are suitable. Such pigment flakes may have an average size of 3 to 50 microns, such as 8 to 50 microns, or 3 to 25 microns, or 8 to 25 microns. In particular examples of the present invention, the effect pigment comprises a metallic flake pigment.

Additional colorants may be used in combination with an effect pigment. Suitable additional pigments include any of those known in the art of surface coatings. Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof.

Each coating composition may be applied by known application techniques, such as dipping or immersion, spraying, intermittent spraying, dipping followed by spraying, spraying followed by dipping, brushing, or by roll-coating. Usual spray techniques and equipment for air spraying and electrostatic spraying, either manual or automatic methods, are most often used.

After application of a composition, a film is formed by driving solvent, i.e., organic solvent and water, out of the film by heating or by an air-drying period. Suitable drying conditions will depend on the particular composition and/or application, but in some instances a drying time of from about 5 to 30 minutes at a temperature of about room temperature to 60° C. will be sufficient. More than one coating layer of each composition may be applied if desired. Usually between coats, the previously applied coat is flashed; that is, exposed to ambient conditions for the desired amount of time.

The curable film-forming compositions of the present invention applied to the substrate typically demonstrate a dry film thickness of at least 15 microns or at least 25 microns, or at least 35 microns, to at most 100 microns or at most 75 microns. Thus, the curable film-forming compositions may demonstrate a dry film thickness of 15 to 100 microns, or 15 to 75 microns, or 25 to 100 microns, or 25 to 75 microns, or 35 to 100 microns, or 35 to 75 microns. Dry film thicknesses may be measured 24 hours after application of the coating when cured at ambient temperatures, using a DUALSCOPE FMP40C with an FD13H probe, available from Fischer Technologies, Inc., according to manufacturer's directions. The composition of the present invention may be cured at ambient temperature typically in a period ranging from about 24 hours to about 36 hours.

EXAMPLES

The following working Examples are intended to further describe the invention. It is understood that the invention described in this specification is not necessarily limited to the examples described in this section. Components that are mentioned elsewhere in the specification as suitable alternative materials for use in the invention, but which are not demonstrated in the working Examples below, are expected to provide results comparable to their demonstrated counterparts. Unless otherwise indicated, all parts are by weight.

GPC: Mw as used herein refers to the weight average molecular weight and means the theoretical value as determined by Gel Permeation Chromatography using A Waters 2695 separation module with a Waters 410 differential refractometer (RI detector) and polystyrene standards. The Mw values reported according to the invention were determined using this method. Tetrahydrofuran (THF) was used as the eluent at a flow rate of 1 ml min-1, and two PL Gel Mixed C columns were used for separation.

The acid value (AV) of polyester grafted polymers may be measured by any suitable method. Methods to measure AV will be well known to a person skilled in the art. Suitably, the AV is determined by titration with 0.1M methanolic potassium hydroxide (KOH) solution. A sample of liquid polyester grafted acrylic (typically, 0.1 to 3 g) is weighed accurately into a conical flask and is dissolved, using light heating and stirring as appropriate, in 25 ml of THF. The solution is then cooled to room temperature and titrated with the 0.1M methanolic potassium hydroxide solution.

Example A

An epoxy-functional acrylic resin was prepared in a 4000 mL pressure reactor system from the components listed below.

| Charge | Ingredients | Parts by weight |
|---|---|---|
| #1 | Amyl propionate | 374.90 |
| | AROMATIC 100[4] | 93.70 |
| #2 | Glycidyl methacrylate | 776.20 |
| | butyl methacrylate | 492.60 |
| | MSD-100 [2] | 25.70 |
| #3 | di-t-butyl peroxide [1] | 104.00 |
| | Amyl propionate | 74.60 |
| | AROMATIC 100 | 18.70 |
| #4 | Amyl propionate | 4.00 |
| | AROMATIC 100 | 1.00 |
| #5 | Glycidyl methacrylate | 183.70 |
| | Methyl methacrylate | 3.20 |
| | Styrene | 112.0 |
| | MSD-100 [2] | 6.10 |
| #6 | Amyl propionate | 4.00 |
| | AROMATIC 100 | 1.00 |
| #7 | Amyl propionate | 4.00 |
| | AROMATIC 100 | 1.00 |
| #8 | Amyl propionate | 91.40 |
| | AROMATIC 100 | 22.80 |
| | L-555 (60% solid) [3] | 26.70 |
| #9 | Amyl propionate | 24.00 |
| | AROMATIC 100 | 6.00 |

[1] Di-t-butyl peroxide is commercially from Arkema, Inc.
[2] MSD-100 is alpha methyl styrene dimer and commercially available from SI group.
[3] L-555 is t-amyl peroxyacetate, commercially available from Arkema, Inc.
[4]AROMATIC 100, CAS number 64742-95-6, is a blend of $C_9$ to $C_{11}$ aromatic hydrocarbons, available from Exxon Mobil Corporation.

Charge 1 was added to a stainless steel pressure reactor equipped with a stirrer, condenser, temperature control system, and two feeding lines under inert gas ($N_2$) connect with pressure capable feed pumps. The reaction mixture was heated to 165° C. with stirring. At ~150° C., nitrogen was turned off and vent closed. At 165° C., Charge 2 was added into reactor over 150 minutes while Charge 3 was added into reactor over 240 minutes simultaneously. After addition of charge 2 was completed, charge 4 was used as a rinse. 30 minutes after charge 2 was completed, Charge 5 was added into reactor over 30 minutes. After addition of charge 5 was completed, charge 6 was used as a rinse. At the completion of Charge 3, Charge 7 was used to rinse Charge 3. The reactor was cooled to 125° C. At 125° C., the pressure was released slowly.

At atmospheric pressure and 125° C., charge 8 was fed into the reactor over 90 minutes. At the completion of charge 8, charge 9 was used as a rinse. After addition of charge 9, the reaction mixture was held at 125° C. for 1 hour. After holding, the reaction mixture was cooled to 40° C. The solids content of the product was 68.21% and Mw was 3312.

Example B

A polyester grafted acrylic resin (i.e., secondary-hydroxyl functional (meth)acrylic polyol having pendant ester functional groups) was prepared in a 2000 mL flask from the components listed below.

| Charge | Ingredients | Parts by weight |
|---|---|---|
| #1 | Epoxy-functional acrylic resin from Example A | 810.00 |
| | ETPPBr [1] | 0.81 |
| | Isostearic acid [2] | 591.05 |

[1] ETPPBr is ethyltriphenyl phosphonium bromide and commercially from Evonik Industries.
[2] Isostearic acid is commercially available from Croda Inc.

Charge 1 was added to a round bottom flask equipped with a stirrer, condenser, temperature control system under a $N_2$ blanket. The reaction mixture was slowly heated to 100°. Then, the reaction mixture was held at 100° C. until the acid value (AV) was less than 2. The reaction mixture was cooled to 40° C. and was poured out. The solids content of the reaction product was 82.5% and Mw was around 6693.

Coated test panels were prepared as follows: (1) an electrocoated substrate (ED7400, available from ACT Test Panels LLC) was cleaned, (2) a sealer (DAS3027/DCX3030/DT885 at 3:1:1 by volume, available from PPG) was spray applied to one surface of the substrate, (3) the substrate was subjected to an ambient (room temperature, ca. 20° C.) flash for 15 mins, (4) DBC silver basecoat (available from PPG; color code 919991) was spray applied on top of the sealer, (5) the substrate was subjected to an ambient flash for 30 mins, (6) the composition of the respective Example was spray applied as a clearcoat (2 coats) on top of the basecoat.

Formulation Examples

TABLE 1

| Solvent Mix | |
|---|---|
| | WEIGHT % |
| Methyl amyl ketone | 30% |
| n-butyl acetate urethane grade | 55% |
| METHYL ETHER PROPYLENE GLYCOL acetate | 10% |
| 2-ETHYLHEXYL ACETATE (OCTYL) | 5% |
| TOTAL | 100% |

TABLE 2

| Hardener Mix 1 | |
|---|---|
| | WEIGHT % |
| TOLONATE HDT LV[1] | 86.3% |
| DESMODUR Z 4470 BA[2] | 13.7% |
| TOTAL | 100.0% |

[1]Aliphatic polyisocyanate available from Vencorex Chemicals
[2]isophorone diisocyanate trimer available from Covestro AG Curable film-forming compositions were prepared using ingredients according to Table 3. Example 1 is a Control example, demonstrating the preparation of a curable film-forming composition using a standard acrylic/polyester polyol resin formulation with a polyisocyanate curing agent (hardener). Example 2 is a comparative example, demonstrating the preparation of a curable film-forming composition using a reactive diluent (a polycaprolactone-derived polyol having a C Log P of 2.89). Examples 3 to 4 demonstrate curable film-forming compositions of the present invention with different reactive diluents: In Comparative Example 2, 10% of the polyester polyol resin solids in Example 1 is replaced by a Reactive Diluent 1-commercial polycaprolactone-based polyol Capa 2054 from Perstorp Group. Example 3 demonstrates the preparation of a curable film-forming composition with 10% of the polyester polyol resin solids in Example 1 replaced by a Reactive Diluent 2, a dimer fatty acid diol. Example 4 demonstrates the preparation of a curable film-forming composition with 10% of the polyester polyol resin solids in Example 1 replaced by a Reactive Diluent 3, a sterically hindered diol with secondary hydroxyl functional groups. Note that Acrylic Polyols 1 and 2 are both secondary hydroxyl functional (meth)acrylic polyols with pendant ester groups, but are prepared with significantly less epoxy functional monomer and hence have fewer pendant ester groups than the secondary hydroxyl functional polyols used in the curable film-forming compositions of the present invention.

TABLE 3

| Name | Example 1 (Control) | Example 2 (Comparative) | Example 3 | Example 4 |
|---|---|---|---|---|
| Acrylic polyol 1[a] | 26.35 | 26.73 | 26.73 | 24.88 |
| Acrylic polyol 2[b] | 37.02 | 37.55 | 37.56 | 34.96 |
| Polyester polyol 1[c] | 25.92 | 18.78 | 18.78 | 17.48 |
| Reactive Diluent 1[d] | | 6.01 | | |
| Reactive Diluent 2[e] | | | 6.01 | |
| Reactive Diluent 3[f] | | | | 5.59 |
| TINUVIN 292[g] | 1 | 1 | 1 | 1 |
| TINUVIN 384-2[h] | 2 | 2 | 2 | 2 |
| 10% dibutyltin dilaurate in solvent mix | 4 | 4 | 4 | 4 |
| 10% TMPMP[i] in solvent mix | 6 | 6 | 6 | 6 |
| BYK306[j] | 0.667 | 0.667 | 0.667 | 0.667 |
| ADDITOL VXL 4903[k] | 0.15 | 0.15 | 0.15 | 0.15 |
| Solvent Mix (Table 1) | 40.34 | 35.03 | 35.01 | 36.83 |
| Hardener Mix 1 (Table 2) | 42.56 | 41.68 | 41.67 | 46.01 |
| TOTAL | 186.0 | 179.6 | 179.6 | 179.6 |
| Solid % by weight | 56% | 58% | 58% | 58% |
| NCO/OH | 1.15 | 1.15 | 1.15 | 1.15 |

TABLE 3-continued

| Name | Example 1 (Control) | Example 2 (Comparative) | Example 3 | Example 4 |
|---|---|---|---|---|
| initial viscosity (Din#4, ambient) | 17.5 | 19.3 | 19.3 | 18.6 |
| flop index over DBC silver[l] | 12.6 | 11.6 | 12.2 | 12.1 |
| L15[m] | 130.8 | 127.3 | 129.5 | 129.2 |

[a]An acrylic polymer made up of about 22.36% isostearic acid, 23.32% hydroxypropyl acrylate, 10.71% methyl methacrylate, 32.4% styrene, and 11.2% glycidyl methacrylate.
[b]Prepared as described in United States Patent Application Publication Number 2007/0117938, Example 19.
[c]A polyester polymer made up of about 19.6% trimethylolpropane, 48% hexahydrophthalic anhydride, and 33% of neopentyl glycol at a solids content of about 79% in 20% MIBK and 80% butyl acetate.
[d]CAPA 2054, a polycaprolactone-based polyol with CLogP = 2.9, available from Perstorp Group
[e]PRIPOL 2030, a dimerized fatty acid diol with CLogP = 15.5, commercially available from Croda International Plc.
[f]POLYOL R 3530, a sterically hindered polyol available from Perstorp Group
[g,h]Hindered amine light stabilizers available from BASF SE of Ludwigshafen, Germany
[i]Trimethylolpropane tri (3-mercaptopropionate), available from Evans Chemetics
[j]Silicone-containing surface additive available from BYK
[k]Modified silicone available from Allnex GmbH
[l,m]Flop index was calculated according to the formula below; lightness was measured using a BYK Mac (average of three measurement): L15 is the lightness at 15° angle, L45 is the lightness at 45° angle, L110 is the lightness at 110° angle.

$$Flopindex = 2.69 \times \frac{(L^*_{15^\circ} - L^*_{110^\circ})^{1.11}}{(L^*_{45^\circ})^{0.86}}$$

As shown in Table 3, the use of a reactive diluent to offer increased hydrophobicity (Example 3) or a reactive diluent with steric hindrance (Example 4) had least impact on flop index while providing high resin solids.

Example 5 is a comparative example with Ready to Spray (RTS) resin solids of 50%. The composition of Comparative Example 5 contains Acrylic Polyol 1 identified above, a secondary hydroxyl functional (meth)acrylic polyol with significantly fewer pendant ester groups than the secondary hydroxyl functional polyols used in the curable film-forming compositions of the present invention. Example 6 is a comparative example containing a commercially available acrylic polyol with RTS resin solids of 58%. Example 7 is an example of the present invention with RTS resin solids of 60%.

TABLE 4

| Hardener Mix 2 | |
|---|---|
| | WEIGHT % |
| DESMODUR N 3400[1] | 48.1% |
| DESMODUR Z 4470 MAK[1] | 51.2% |
| MAK | 0.7% |
| TOTAL | 100.0% |

[1]Aliphatic polyisocyanates available from Covestro AG

TABLE 5

| Name | Example 5 (Comparative) | Example 6 (Comparative) | Example 7 |
|---|---|---|---|
| Acrylic polyol 1[a] | 112 | | |
| Acrylic polyol[b] | | 79.61 | |
| Secondary-hydroxyl functional (meth)acrylic polyol of Example B having pendant ester functional groups | | | 86.22 |
| TINUVIN 292 | 1 | 1 | 1 |
| TINUVIN 384-2 | 2 | 2 | 2 |
| 10% DBTDL in solvent mix | 0.62 | 0.62 | 0.62 |
| BYK300 | 0.52 | 0.52 | 0.52 |
| Methyl Amyl Ketone | 8.35 | 5.6 | 8.81 |
| Solvent Package DT885, available from PPG | 43.76 | 45.54 | 38.58 |
| Hardener mix 2 | 44.8 | 43.39 | 34.51 |
| TOTAL | 213.05 | 178.28 | 172.26 |
| Solid % by weight | 49% | 58% | 60% |
| NCO/OH | 1.25 | 1.25 | 1.25 |
| initial viscosity (Din#4, ambient) | 16.1 | 16 | 18.6 |
| flop index over DBC silver | 14.2 | 12.3 | 15.2 |
| L15 | 137.0 | 129.5 | 140.4 |

[a]An acrylic polymer made up of about 22.36% isostearic acid, 23.32% hydroxypropyl acrylate, 10.71% methyl methacrylate, 32.4% styrene, and 11.2% glycidyl methacrylate.
[b]JONCRYL RPD 980-B, Commercially available from BASF As shown in Table 5, the use of a secondary-hydroxyl functional (meth)acrylic polyol having few pendant ester functional groups as in Comparative Example 5 caused a drop in resin solids. Increasing the resin solids content of the coating composition in a conventional manner as in Comparative Example 6 (in this case, by using a lower molecular weight polyol) typically reduced the flop index. Example 7, a composition that comprises a secondary-hydroxyl functional (meth)acrylic polyol having pendant ester functional groups in accordance with the present invention, showed increased flop index even at increased solids content.

Whereas particular embodiments of this invention have been described above for purposes of illustration, it will be evident to those skilled in the art that numerous variations of the details of the present invention may be made without departing from the scope of the invention as defined in the appended claims.

We claim:

1. A curable film-forming composition comprising:

(a) a polyisocyanate curing agent having isocyanate functional groups; and (b) a film-forming component comprising (i) a secondary-hydroxyl functional (meth)acrylic polyol having pendant ester functional groups and having a weight average molecular weight of 4000 to 8000 as determined by gel permeation chromatography using a polystyrene standard, wherein the secondary hydroxyl functional (meth)acrylic polyol contains residues of an epoxy functional ethylenically unsaturated monomer from which the ester functional groups are pendant, wherein the residues are formed by reaction of epoxy functional groups with a carboxylic acid having from 5 to 20 carbon atoms, and wherein the residues are present in the secondary hydroxyl functional (meth)acrylic polyol in an amount of 20 to 35 percent by weight, based on the total weight of the secondary hydroxyl functional (meth)acrylic polyol; and (ii) a reactive constituent comprising:

(1) a polymeric polyol comprising a polyester polyol and/or an addition polymer that is different from the secondary-hydroxyl functional (meth)acrylic polyol (i); and (2) an organic medium comprising a reactive diluent, wherein the reactive diluent comprises at least one of castor oil; a dimerized fatty acid diol; a hydroxyl functional branched polyolefin oil; a cashew nutshell liquid (CNSL)-based diol; an alkoxylated diol comprising a secondary hydroxyl group wherein the diol contains 2 to 6 carbon atoms prior to alkoxylation; an alkoxylated triol comprising a secondary hydroxyl group, wherein the triol contains 2 to 6 carbon atoms prior to alkoxylation, and an alkoxylated tetrol comprising a secondary hydroxyl group, wherein the tetrol contains 2 to 6 carbon atoms prior to alkoxylation; wherein the polymeric polyol (1) is different from and is not prepared in the reactive diluent, and wherein the curable film-forming composition has a total resin solids content of at least 55 percent by weight, and at most 80 percent by weight, based on the total weight of the curable film-forming composition.

2. The curable film-forming composition of claim 1, wherein the film-forming component (b) comprises the secondary-hydroxyl functional (meth)acrylic polyol (i), and wherein the secondary-hydroxyl functional (meth)acrylic polyol (i) comprises a reaction product of a (meth)acrylic polymer having pendant epoxy functional groups and a carboxylic acid comprising at least one of isostearic acid, benzoic acid, 2-ethylhexanoic acid, isononanoic acid, pivalic acid, and 12-hydroxystearic acid.

3. The curable film-forming composition of claim 1, wherein the reactive diluent is present in the curable film-forming composition in an amount of at least 5 percent by weight, and at most 50 percent by weight, based on the total weight of polyol solids in the curable film-forming composition.

4. The curable film-forming composition of claim 1, wherein the curable film-forming composition comprises multiple, separate packages, wherein a first package comprises the polyisocyanate curing agent (a); and wherein a second package comprises:

(I) the reactive constituent (ii); and wherein the reactive diluent is present in the second package or in a third package; or (II) the secondary-hydroxyl functional (meth)acrylic polyol (i);

and wherein the packages are separate from one another until immediately prior to application of the curable film-forming composition to a substrate.

5. The curable film-forming composition of claim 1, wherein the curable film-forming composition has a volatile organic compound (VOC) content less than 3.5 lb/gallon.

6. A curable film-forming composition comprising:

(a) a polyisocyanate curing agent having isocyanate functional groups; and (b) a film-forming component comprising:

(i) a secondary-hydroxyl functional (meth)acrylic polyol having pendant ester functional groups and having a weight average molecular weight of 4000 to 8000 as determined by gel permeation chromatography using a polystyrene standard, wherein the secondary hydroxyl functional (meth)acrylic polyol contains residues of an epoxy functional ethylenically unsaturated monomer from which the ester functional groups are pendant, wherein the residues are formed by reaction of epoxy functional groups with a carboxylic acid having from 5 to 20 carbon atoms, and wherein the residues are present in the secondary hydroxyl functional (meth)acrylic polyol in an amount of 20 to 35 percent by weight, based on the total weight of the secondary hydroxyl functional (meth)acrylic polyol; and (ii) at least one of:

(1) a polymeric polyol comprising a polyester polyol and/or an addition polymer that is different from the secondary-hydroxyl functional (meth)acrylic polyol (i); and (2) an organic medium comprising a reactive diluent, wherein the reactive diluent comprises at least one of castor oil; a dimerized fatty acid diol; a hydroxyl functional branched polyolefin oil; a cashew nut shell liquid (CNSL)-based diol; an alkoxylated diol comprising a secondary hydroxyl group wherein the dial contains 2 to 6 carbon atoms prior to alkoxylation; an alkoxylated trial comprising a secondary hydroxyl group, wherein the trial contains 2 to 6 carbon atoms prior to alkoxylation, and an alkoxylated tetrol comprising a secondary hydroxyl group, wherein the tetrol contains 2 to 6 carbon atoms prior to alkoxylation;

wherein the polymeric polyol (1) is different from and is not prepared in the reactive diluent, and wherein the curable film-forming composition has a total resin solids content of at least 55 percent by weight, and at most 80 percent by weight, based on the total weight of the curable film-forming composition.

7. The curable film-forming composition of claim 6, wherein the wherein the secondary-hydroxyl functional (meth)acrylic polyol (i) comprises a reaction product of a (meth)acrylic polymer having pendant epoxy functional groups and a carboxylic acid comprising at least one of isostearic acid, benzoic acid, 2-ethylhexanoic acid, isononanoic acid, pivalic acid, and 12-hydroxystearic acid.

8. The curable film-forming composition of claim 6, wherein the film-forming component (b) comprises the polymeric polyol (1).

9. The curable film-forming composition of claim 6, wherein the film-forming component (b) comprises the organic medium (2).

10. The curable film-forming composition of claim 9, wherein the reactive diluent is present in the curable film-forming composition in an amount of at least 5 percent by weight, and at most 50 percent by weight, based on the total weight of polyol solids in the curable film-forming composition.

11. The curable film-forming composition of claim 6, wherein the curable film-forming composition comprises multiple, separate packages, wherein a first package comprises the polyisocyanate curing agent (a); and wherein a second package comprises the film-forming component (b); and wherein the packages are separate from one another until immediately prior to application of the curable film-forming composition to a substrate.

12. The curable film-forming composition of claim 6, wherein the curable film-forming composition has a volatile organic compound (VOC) content less than 3.5 lb/gallon.

13. A coating kit comprising the curable film-forming composition of claim 1 prepared as a first package and a second package, wherein the first package comprises the polyisocyanate curing agent (a) having isocyanate functional groups, and the second package comprises the film-forming component (b), and wherein the packages are separate from one another until immediately prior to application to a substrate.

14. The coating kit of claim 13, wherein the secondary-hydroxyl functional (meth)acrylic polyol (i) is present and comprises a reaction product of a (meth)acrylic polymer having pendant epoxy functional groups and a carboxylic acid comprising at least one of isostearic acid, benzoic acid, 2-ethylhexanoic acid, isononanoic acid, pivalic acid, and 12-hydroxystearic acid.

15. The coating kit of claim 13, wherein the coating kit has a volatile organic compound (VOC) content less than 3.5 lb/gallon.

* * * * *